US008680037B2

(12) United States Patent
Robin

(10) Patent No.: US 8,680,037 B2
(45) Date of Patent: *Mar. 25, 2014

(54) AZEOTROPIC AND AZEOTROPE-LIKE COMPOSITIONS OF Z-1,1,1,4,4,4-HEXAFLUORO-2-BUTENE AND ETHANOL

(75) Inventor: Mark Robin, Middletown, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 92 days.

This patent is subject to a terminal disclaimer.

(21) Appl. No.: 13/321,074

(22) PCT Filed: Jun. 2, 2010

(86) PCT No.: PCT/US2010/036989
§ 371 (c)(1),
(2), (4) Date: Nov. 17, 2011

(87) PCT Pub. No.: WO2010/141527
PCT Pub. Date: Dec. 9, 2010

(65) Prior Publication Data
US 2012/0056124 A1  Mar. 8, 2012

Related U.S. Application Data

(60) Provisional application No. 61/296,547, filed on Jan. 20, 2010, provisional application No. 61/293,767, filed on Jan. 11, 2010, provisional application No. 61/293,765, filed on Jan. 11, 2010, provisional application No. 61/293,763, filed on Jan. 11, 2010, provisional application No. 61/286,863, filed on Dec. 16, 2009, provisional application No. 61/286,868, filed on Dec. 16, 2009, provisional application No. 61/286,870, filed on Dec. 16, 2009, provisional application No. 61/286,872, filed on Dec. 16, 2009, provisional application No. 61/183,203, filed on Jun. 2, 2009, provisional application No. 61/183,197, filed on Jun. 2, 2009.

(51) Int. Cl.
*C11D 7/50* (2006.01)

(52) U.S. Cl.
USPC ............................. 510/408; 510/415; 252/67

(58) Field of Classification Search
USPC ...................... 252/67; 510/408, 415
See application file for complete search history.

(56) References Cited

U.S. PATENT DOCUMENTS 5,578,137 A   11/1996  Shealy
5,851,436 A * 12/1998  Merchant et al. ............. 252/364

(Continued)

FOREIGN PATENT DOCUMENTS

WO   2007100885 A2   9/2007
WO   2008134061 A2   11/2008

(Continued)

OTHER PUBLICATIONS

M. F. Doherty and M.F. Malone, Conceptual Design of Distillation Systems, McGraw-Hill (New York), 2001, 185-186, 351-359.

(Continued)

*Primary Examiner* — Gregory Webb

(57) ABSTRACT

Azeotropic or azeotrope-like compositions are disclosed. The azeotropic or azeotrope-like compositions are mixtures of Z-1,1,1,4,4,4-hexafluoro-2-butene with ethanol, 2-chloro-3,3,3-trifluoropropene, methanol, E-1,1,1,4,4,5,5,5-octafluoro-2-pentene, 2-bromo-3,3,3-trifluoropropene, methyl acetate, acetone, chloroform, n-hexane or 1-chloro-3,3,3-trifluoropropene. Also disclosed is a process of preparing a thermoplastic or thermoset foam by using such azeotropic or azeotrope-like compositions as blowing agents. Also disclosed is a process of producing refrigeration by using such azeotropic or azeotrope-like compositions. Also disclosed is a process of using such azeotropic or azeotrope-like compositions as solvents. Also disclosed is a process of producing an aerosol product by using such azeotropic or azeotrope-like compositions. Also disclosed is a process of using such azeotropic or azeotrope-like compositions as heat transfer media. Also disclosed is a process of extinguishing or suppressing a fire by using such azeotropic or azeotrope-like compositions. Also disclosed is a process of using such azeotropic or azeotrope-like compositions as dielectrics.

4 Claims, 10 Drawing Sheets

Z-FO-1336mzz and Ethanol at 50.0 °C

(56) References Cited

U.S. PATENT DOCUMENTS

| | | | |
|---|---|---|---|
| 7,494,603 B2* | 2/2009 | Minor et al. | 252/67 |
| 7,498,296 B2* | 3/2009 | Schweitzer et al. | 510/177 |
| 7,622,053 B2* | 11/2009 | Minor et al. | 252/67 |
| 7,972,524 B2* | 7/2011 | Robin | 252/2 |
| 7,972,525 B2* | 7/2011 | Robin | 252/2 |
| 8,262,924 B2* | 9/2012 | Robin | 252/2 |
| 2008/0269532 A1 | 10/2008 | Swearingen | |
| 2010/0032610 A1* | 2/2010 | Nappa et al. | 252/67 |
| 2010/0078585 A1* | 4/2010 | Robin | 252/2 |
| 2010/0163776 A1* | 7/2010 | Robin | 252/2 |
| 2010/0174123 A1* | 7/2010 | Sievert et al. | 570/136 |
| 2010/0243943 A1* | 9/2010 | Robin | 252/3 |
| 2011/0147638 A1* | 6/2011 | Robin et al. | 252/2 |
| 2011/0218261 A1 | 9/2011 | Loh et al. | |
| 2011/0220832 A1* | 9/2011 | Robin | 252/2 |
| 2011/0240903 A1* | 10/2011 | Robin | 252/2 |
| 2011/0260093 A1* | 10/2011 | Robin | 252/8 |
| 2012/0056124 A1* | 3/2012 | Robin | 252/67 |
| 2012/0309824 A1* | 12/2012 | Robin et al. | 514/475 |
| 2012/0323054 A1* | 12/2012 | Knapp | 570/178 |

FOREIGN PATENT DOCUMENTS

| | | |
|---|---|---|
| WO | 2009032983 A1 | 3/2009 |
| WO | 2009155490 A1 | 12/2009 |

OTHER PUBLICATIONS

"Phase Equilibrium in Process Design", Wiley-Interscience Publisher, 1970, written by Harold R. Null, on pp. 124 to 126.

"The Properties of Gases and Liquids," 4th edition, published by McGraw Hill, written by Reid, Prausnitz and Poling, on pp. 241 to 387.

"Phase Equilibria in Chemical Engineering," published by Butterworth Publishers, 1985, written by Stanley M. Walas, pp. 165 to 244.

M. F. Doherty and M. F. Malone, "Conceptual Design of Distillation Systems", McGraw-Hill (new York), 2001, pp. 185-186, 351-359.

* cited by examiner

AZEOTROPIC AND AZEOTROPE-LIKE COMPOSITIONS OF Z-1,1,1,4,4,4-HEXAFLUORO-2-BUTENE AND ETHANOL

This application claims priority of U.S. Patent Applications 61/183,203 and 61/183,197 filed Jun. 2, 2009, U.S. Patent Applications 61/286,868, 61/286,872, 61/286,870 and 61/286,863 filed Dec. 16, 2009, U.S. Patent Applications 61/293,763, 61/293,765 and 61/293,767 filed Jan. 11, 2010, U.S. Patent Application 61/296,547 filed Jan. 20, 2010.

BACKGROUND OF THE INVENTION

1. Field of the Disclosure

The present disclosure relates to azeotropic or azeotrope-like compositions of Z-1,1,1,4,4,4-hexafluoro-2-butene.

2. Description of Related Art

Many industries have been working for the past few decades to find replacements for the ozone depleting chlorofluorocarbons (CFCs) and hydrochlorofluorocarbons (HCFCs). The CFCs and HCFCs have been employed in a wide range of applications, including their use as aerosol propellants, refrigerants, cleaning agents, expansion agents for thermoplastic and thermoset foams, heat transfer media, gaseous dielectrics, fire extinguishing and suppression agents, power cycle working fluids, polymerization media, particulate removal fluids, carrier fluids, buffing abrasive agents, and displacement drying agents. In the search for replacements for these versatile compounds, many industries have turned to the use of hydrofluorocarbons (HFCs).

The HFCs do not contribute to the destruction of stratospheric ozone, but are of concern due to their contribution to the "greenhouse effect", i.e., they contribute to global warming. As a result of their contribution to global warming, the HFCs have come under scrutiny, and their widespread use may also be limited in the future. Thus, there is a need for compositions that do not contribute to the destruction of stratospheric ozone and also have low global warming potentials (GWPs). Certain hydrofluoroolefins, such as 1,1,1,4,4,4-hexafluoro-2-butene ($CF_3CH=CHCF_3$, FC-1336mzz, FO-1336mzz), are believed to meet both goals.

SUMMARY OF THE INVENTION

This application includes ten different types of azeotropic or azeotrope-like mixtures.

This disclosure provides a composition consisting essentially of (a) Z-FO-1336mzz and (b) a component selected from the group consisting of ethanol, 2-chloro-3,3,3-trifluoropropene, methanol, E-1,1,1,4,4,5,5,5-octafluoro-2-pentene, 2-bromo-3,3,3-trifluoropropene, methyl acetate, acetone, chloroform, n-hexane and 1-chloro-3,3,3-trifluoropropene; wherein said component is present in an effective amount to form an azeotrope-like combination with the Z-1,1,1,4,4,4-hexafluoro-2-butene.

This disclosure also provides a composition consisting essentially of (a) Z-FO-1336mzz and (b) a component selected from the group consisting of ethanol, methanol, E-1,1,1,4,4,5,5,5-octafluoro-2-pentene, 2-bromo-3,3,3-trifluoropropene, chloroform and n-hexane; wherein said component is present in an effective amount to form an azeotropic combination with the Z-1,1,1,4,4,4-hexafluoro-2-butene.

DETAILED DESCRIPTION OF THE INVENTION

Figure 1:
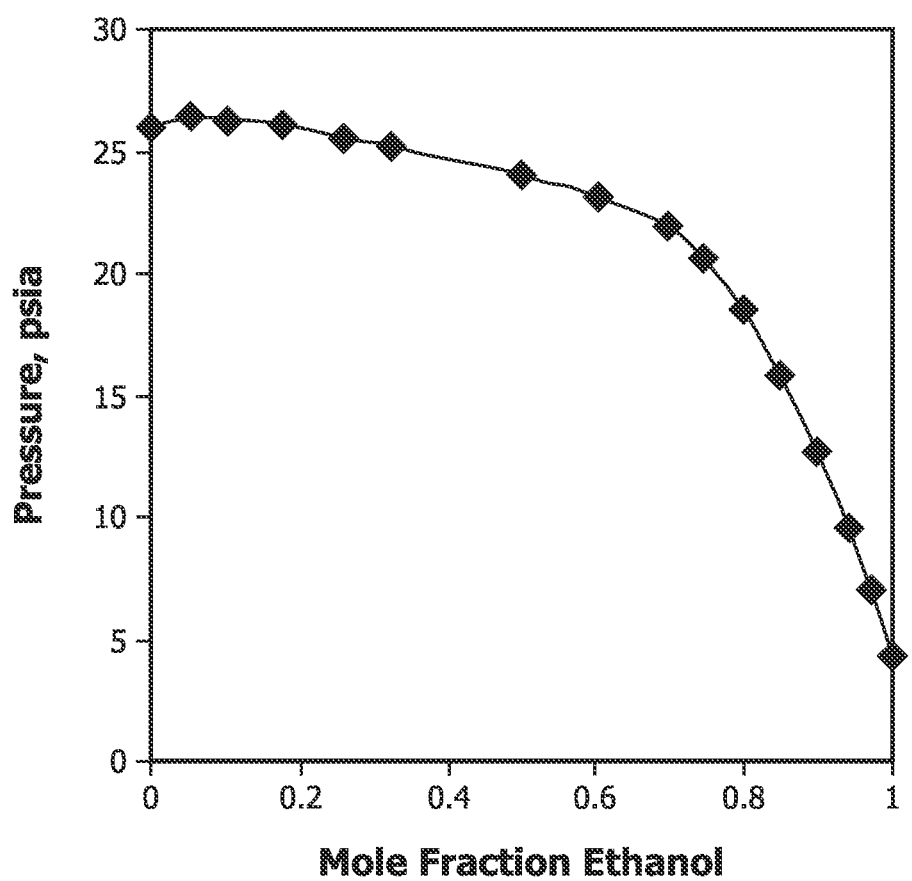
FIG. 1 is a graphical representation of an azeotrope and azeotrope-like compositions consisting essentially of Z-FO-1336mzz and ethanol at a temperature of about 50.0° C.

In many applications, the use of a pure single component or an azeotropic or azeotrope-like mixture is desirable. For example, when a blowing agent composition (also known as foam expansion agents or foam expansion compositions) is not a pure single component or an azeotropic or azeotrope-like mixture, the composition may change during its application in the foam forming process. Such change in composition could detrimentally affect processing or cause poor performance in the application. Also, in refrigeration applications, a refrigerant is often lost during operation through leaks in shaft seals, hose connections, soldered joints and broken lines. In addition, the refrigerant may be released to the atmosphere during maintenance procedures on refrigeration equipment. If the refrigerant is not a pure single component or an azeotropic or azeotrope-like composition, the refrigerant composition may change when leaked or discharged to the atmosphere from the refrigeration equipment. The change in refrigerant composition may cause the refrigerant to become flammable or to have poor refrigeration performance. Accordingly, there is a need for using azeotropic or azeotrope-like mixtures in these and other applications, for example azeotropic or azeotrope-like mixtures containing Z-1,1,1,4,4,4-hexafluoro-2-butene (Z-$CF_3CH=CHCF_3$, Z-FO-1336mzz, Z-FC-1336mzz, Z-HFO-1336mzz).

Before addressing details of embodiments described below, some terms are defined or clarified.

FO-1336mzz may exist as one of two configurational isomers, E or Z. FO-1336mzz as used herein refers to the isomers, Z-FO-1336mzz or E-FO-1336mzz, as well as any combinations or mixtures of such isomers.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

Z-FO-1336mzz is a known compound, and its preparation method has been disclosed, for example, by Swearingen in U.S. Patent Application Publication US 2008-0269532 A1, hereby incorporated by reference in its entirety.

This application includes azeotropic or azeotrope-like compositions comprising Z-FO-1336mzz.

In some embodiments of this invention, the composition consists essentially of: (a) Z-1,1,1,4,4,4-hexafluoro-2-butene; and (b) a component selected from the group consisting of ethanol, 2-chloro-3,3,3-trifluoropropene, methanol, E-1,1,1,4,4,5,5,5-octafluoro-2-pentene, 2-bromo-3,3,3-trifluoropropene, methyl acetate, acetone, chloroform, n-hexane and 1-chloro-3,3,3-trifluoropropene; wherein said component is present in an effective amount to form an azeotrope-like combination with the Z-1,1,1,4,4,4-hexafluoro-2-butene.

In some embodiments of this invention, the composition consists essentially of: (a) Z-1,1,1,4,4,4-hexafluoro-2-butene; and (b) a component selected from the group consisting of ethanol, methanol, E-1,1,1,4,4,5,5,5-octafluoro-2-pentene, 2-bromo-3,3,3-trifluoropropene, chloroform and n-hexane; wherein said component is present in an effective amount to form an azeotropic combination with the Z-1,1,1,4,4,4-hexafluoro-2-butene.

In some embodiments of this invention, the component is ethanol and the composition consists essentially of (a) Z-FO-1336mzz and (b) ethanol; wherein the ethanol is present in an effective amount to form an azeotropic or azeotrope-like mixture with Z-FO-1336mzz.

In some embodiments of this invention, the component is 2-chloro-3,3,3-trifluoropropene and the composition consists essentially of (a) Z-FO-1336mzz and (b) 2-chloro-3,3,3-trifluoropropene; wherein the 2-chloro-3,3,3-trifluoropropene is present in an effective amount to form an azeotrope-like mixture with Z-FO-1336mzz.

In some embodiments of this invention, the component is methanol and the composition consists essentially of (a) Z-FO-1336mzz and (b) methanol; wherein the methanol is present in an effective amount to form an azeotropic or azeotrope-like mixture with Z-FO-1336mzz.

In some embodiments of this invention, the component is E-1,1,1,4,4,5,5,5-octafluoro-2-pentene and the composition consists essentially of (a) Z-FO-1336mzz and (b) E-1,1,1,4,4,5,5,5-octafluoro-2-pentene; wherein the E-1,1,1,4,4,5,5,5-octafluoro-2-pentene is present in an effective amount to form an azeotropic or azeotrope-like mixture with Z-FO-1336mzz.

In some embodiments of this invention, the component is 2-bromo-3,3,3-trifluoropropene and the composition consists essentially of (a) Z-FO-1336mzz and (b) 2-bromo-3,3,3-trifluoropropene; wherein the 2-bromo-3,3,3-trifluoropropene is present in an effective amount to form an azeotropic or azeotrope-like mixture with Z-FO-1336mzz.

In some embodiments of this invention, the component is methyl acetate and the composition consists essentially of (a) Z-FO-1336mzz and (b) methyl acetate; wherein the methyl acetate is present in an effective amount to form an azeotrope-like mixture with Z-FO-1336mzz.

In some embodiments of this invention, the component is acetone and the composition consists essentially of (a) Z-FO-1336mzz and (b) acetone; wherein the acetone is present in an effective amount to form an azeotrope-like mixture with Z-FO-1336mzz.

In some embodiments of this invention, the component is chloroform and the composition consists essentially of (a) Z-FO-1336mzz and (b) chloroform; wherein the chloroform is present in an effective amount to form an azeotropic or azeotrope-like mixture with Z-FO-1336mzz.

In some embodiments of this invention, the component is n-hexane and the composition consists essentially of (a) Z-FO-1336mzz and (b) n-hexane; wherein the n-hexane is present in an effective amount to form an azeotropic or azeotrope-like mixture with Z-FO-1336mzz.

In some embodiments of this invention, the component is 1-chloro-3,3,3-trifluoropropene and the composition consists essentially of (a) Z-FO-1336mzz and (b) 1-chloro-3,3,3-trifluoropropene; wherein the 1-chloro-3,3,3-trifluoropropene is present in an effective amount to form an azeotrope-like mixture with Z-FO-1336mzz.

By effective amount is meant an amount, which, when combined with Z-FO-1336mzz, results in the formation of an azeotropic or azeotrope-like mixture. This definition includes the amounts of each component, which amounts may vary depending on the pressure applied to the composition so long as the azeotropic or azeotrope-like compositions continue to exist at the different pressures, but with possible different boiling points. Therefore, effective amount includes the amounts, such as may be expressed in weight or mole percentages, of each component of the compositions of the instant invention which form azeotropic or azeotrope-like compositions at temperatures or pressures other than as described herein.

As recognized in the art, an azeotropic composition is an admixture of two or more different components which, when in liquid form under a given pressure, will boil at a substantially constant temperature, which temperature may be higher or lower than the boiling temperatures of the individual components, and which will provide a vapor composition essentially identical to the overall liquid composition undergoing boiling. (see, e.g., M. F. Doherty and M. F. Malone, Conceptual Design of Distillation Systems, McGraw-Hill (New York), 2001, 185-186, 351-359).

Accordingly, the essential features of an azeotropic composition are that at a given pressure, the boiling point of the liquid composition is fixed and that the composition of the vapor above the boiling composition is essentially that of the overall boiling liquid composition (i.e., no fractionation of the components of the liquid composition takes place). It is also recognized in the art that both the boiling point and the weight percentages of each component of the azeotropic composition may change when the azeotropic composition is subjected to boiling at different pressures. Thus, an azeotropic composition may be defined in terms of the unique relationship that exists among the components or in terms of the compositional ranges of the components or in terms of exact weight percentages of each component of the composition characterized by a fixed boiling point at a specified pressure.

For the purpose of this invention, an azeotrope-like composition means a composition that behaves like an azeotropic composition (i.e., has constant boiling characteristics or a tendency not to fractionate upon boiling or evaporation). Hence, during boiling or evaporation, the vapor and liquid compositions, if they change at all, change only to a minimal or negligible extent. This is to be contrasted with non-azeotrope-like compositions in which during boiling or evaporation, the vapor and liquid compositions change to a substantial degree.

Additionally, azeotrope-like compositions exhibit dew point pressure and bubble point pressure with virtually no pressure differential. That is to say that the difference in the dew point pressure and bubble point pressure at a given temperature will be a small value. In this invention, compositions with a difference in dew point pressure and bubble point pressure of less than or equal to 5 percent (based upon the bubble point pressure) is considered to be azeotrope-like.

It is recognized in this field that when the relative volatility of a system approaches 1.0, the system is defined as forming an azeotropic or azeotrope-like composition. Relative volatility is the ratio of the volatility of component 1 to the volatility of component 2. The ratio of the mole fraction of a component in vapor to that in liquid is the volatility of the component.

To determine the relative volatility of any two compounds, a method known as the PTx method can be used. In this procedure, the total absolute pressure in a cell of known volume is measured at a constant temperature for various compositions of the two compounds. Use of the PTx Method is described in detail in "Phase Equilibrium in Process Design", Wiley-Interscience Publisher, 1970, written by Harold R. Null, on pages 124 to 126; hereby incorporated by reference.

These measurements can be converted into equilibrium vapor and liquid compositions in the PTx cell by using an activity coefficient equation model, such as the Non-Random, Two-Liquid (NRTL) equation, to represent liquid phase non-idealities. Use of an activity coefficient equation, such as the NRTL equation is described in detail in "The Properties of Gases and Liquids," 4th edition, published by McGraw Hill, written by Reid, Prausnitz and Poling, on pages 241 to 387, and in "Phase Equilibria in Chemical Engineering," published by Butterworth Publishers, 1985, written by Stanley M. Walas, pages 165 to 244. Both aforementioned references are hereby incorporated by reference. Without wishing to be bound by any theory or explanation, it is believed that the NRTL equation, together with the PTx cell data, can sufficiently predict the relative volatilities of the Z-1,1,1,4,4,4-hexafluoro-2-butene-containing compositions of the present invention and can therefore predict the behavior of these mixtures in multi-stage separation equipment such as distillation columns.

It was found through experiments that Z-FO-1336mzz and ethanol ($CH_3CH_2OH$) form azeotropic or azeotrope-like compositions.

To determine the relative volatility of this binary pair, the PTx method described above was used. The total absolute pressure in a PTx cell of known volume was measured at constant temperature for various binary compositions. These measurements were then reduced to equilibrium vapor and liquid compositions in the cell using the NRTL equation.

The vapor pressure measured versus the compositions in the PTx cell for Z-FO-1336mzz/ethanol mixture is shown in FIG. 1, which graphically illustrates the formation of an azeotropic and azeotrope-like composition consisting essentially of Z-FO-1336mzz and ethanol as indicated by a mixture of about 93.9 mole % Z-1,1,1,4,4,4-hexafluoro-2-butene and 6.1 mole % ethanol having the highest pressure over the range of compositions at this temperature. Based upon these findings, it has been calculated that Z-FO-1336mzz and ethanol form azeotropic compositions ranging from about 96.1 mole percent to about 88.5 mole percent Z-FO-1336mzz and from about 3.9 mole percent to about 11.5 mole percent ethanol (which form azeotropic compositions boiling at a temperature of from about −40° C. to about 140° C. and at a pressure of from about 0.3 psia (2.1 kPa) to about 244 psia (1682 kPa)). Some embodiments of azeotropic compositions are listed in Table 1.

TABLE 1

| Azeotropic compositions | | | |
|---|---|---|---|
| Azeotropic Temperature (° C.) | Azeotropic Pressure (psia) | Z-FO-1336mzz (mole %) | Ethanol (mole %) |
| 33.1 | 14.7 | 94.6 | 5.4 |
| 50.0 | 26.3 | 93.9 | 6.1 |

Additionally, azeotrope-like compositions containing Z-FO-1336mzz and ethanol may also be formed. Such azeotrope-like compositions exist around azeotropic compositions. Some embodiments of azeotrope-like compositions are listed in Table 2. Additional embodiments of azeotrope-like compositions are listed in Table 3

TABLE 2

| Azeotrope-like compositions | | |
|---|---|---|
| COMPONENTS | T (° C.) | Mole Percentage Range |
| Z-FO-1336mzz/Ethanol | −40 | 98-99/1-2 |
| Z-FO-1336mzz/Ethanol | −20 | 96-99/1-4 |
| Z-FO-1336mzz/Ethanol | 0 | 94-99/1-6 |
| Z-FO-1336mzz/Ethanol | 20 | 91-99/1-9 |
| Z-FO-1336mzz/Ethanol | 40 | 88-99/1-12 |
| Z-FO-1336mzz/Ethanol | 60 | 86-99/1-14 |
| Z-FO-1336mzz/Ethanol | 80 | 83-99/1-17 |
| Z-FO-1336mzz/Ethanol | 100 | 79-99/1-21 |
| Z-FO-1336mzz/Ethanol | 120 | 76-99/1-24 |
| Z-FO-1336mzz/Ethanol | 140 | 73-99/1-27 |

TABLE 3

| Azeotrope-like compositions | | |
|---|---|---|
| COMPONENTS | T (° C.) | Mole Percentage Range |
| Z-FO-1336mzz/Ethanol | −40 | 98-99/1-2 |
| Z-FO-1336mzz/Ethanol | −20 | 96-99/1-4 |
| Z-FO-1336mzz/Ethanol | 0 | 94-95/5-6 |
| Z-FO-1336mzz/Ethanol | 20 | 91-95/5-9 |
| Z-FO-1336mzz/Ethanol | 40 | 88-95/5-12 |
| Z-FO-1336mzz/Ethanol | 60 | 86-95/5-14 |

TABLE 3-continued

Azeotrope-like compositions

| COMPONENTS | T (° C.) | Mole Percentage Range |
|---|---|---|
| Z-FO-1336mzz/Ethanol | 80 | 83-95/5-17 |
| Z-FO-1336mzz/Ethanol | 100 | 79-95/5-21 |
| Z-FO-1336mzz/Ethanol | 120 | 76-95/5-24 |
| Z-FO-1336mzz/Ethanol | 140 | 73-95/5-27 |

It was found through experiments that Z-FO-1336mzz and 2-chloro-3,3,3-trifluoropropene ($CF_3CCl=CH_2$, FO-1233xf) form azeotrope-like compositions. To determine the relative volatility of this binary pair, the PTx method described above was used. The total absolute pressure in a PTx cell of known volume was measured at constant temperature for various binary compositions. These measurements were then reduced to equilibrium vapor and liquid compositions in the cell using the NRTL equation.

Figure 2:
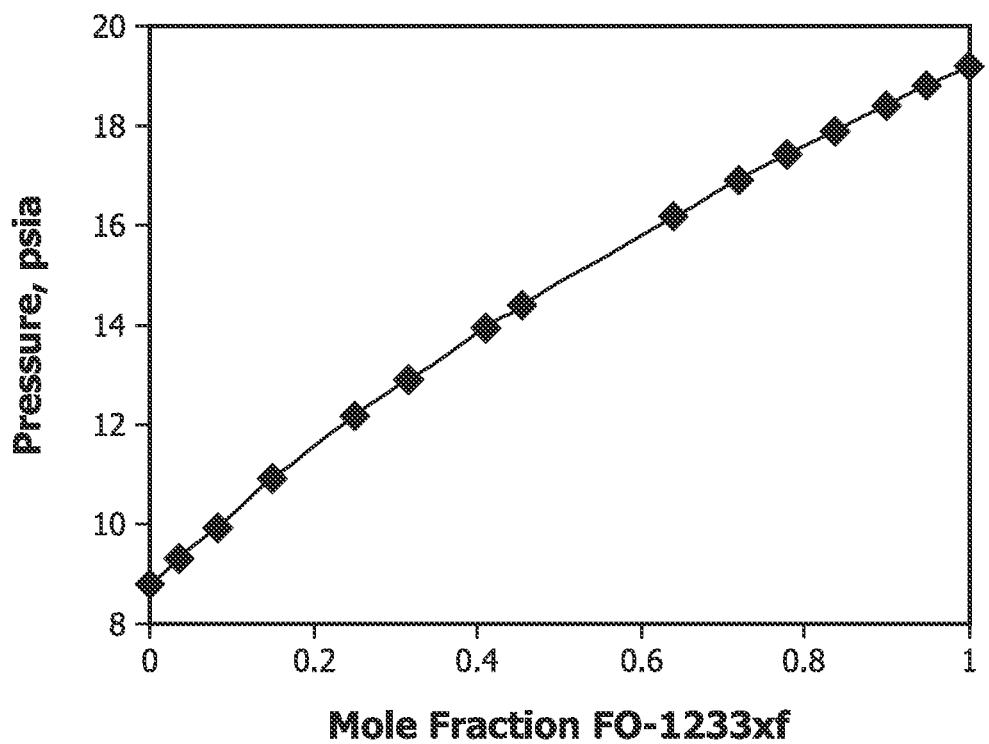
FIG. 2 is a graphical representation of azeotrope-like compositions consisting essentially of Z-FO-1336mzz and 2-chloro-3,3,3-trifluoropropene at a temperature of about 20.0° C.

The vapor pressure measured versus the compositions in the PTx cell for Z-FO-1336mzz/2-chloro-3,3,3-trifluoropropene mixture is shown in FIG. 2, which illustrates graphically the formation of azeotrope-like compositions consisting essentially of from about 1 to about 16 mole % Z-1,1,1,4,4,4-hexafluoro-2-butene and from about 99 to about 84 mole % 2-chloro-3,3,3-trifluoropropene at about 20.0° C. and about 18 psia (124 kPa). FIG. 2 also illustrates graphically the formation of azeotrope-like compositions consisting essentially of from about 94 to about 99 mole % Z-1,1,1,4,4,4-hexafluoro-2-butene and from about 6 to about 1 mole % 2-chloro-3,3,3-trifluoropropene at about 20.0° C. and about 9 psia (62 kPa).

Some embodiments of azeotrope-like compositions are listed in Table 4. Additional embodiments of azeotrope-like compositions are listed in Table 5.

TABLE 4

Azeotrope-like compositions

| COMPONENTS | T (° C.) | Mole Percentage Range |
|---|---|---|
| Z-FO-1336mzz/$CF_3CCl=CH_2$ | −40 | 1-6/94-99 and 98-99/1-2 |
| Z-FO-1336mzz/$CF_3CCl=CH_2$ | −20 | 1-9/91-99 and 97-99/1-3 |
| Z-FO-1336mzz/$CF_3CCl=CH_2$ | 0 | 1-12/88-99 and 96-99/1-4 |
| Z-FO-1336mzz/$CF_3CCl=CH_2$ | 20 | 1-16/84-99 and 94-99/1-6 |
| Z-FO-1336mzz/$CF_3CCl=CH_2$ | 40 | 1-21/79-99 and 92-99/1-8 |
| Z-FO-1336mzz/$CF_3CCl=CH_2$ | 60 | 1-27/73-99 and 89-99/1-11 |
| Z-FO-1336mzz/$CF_3CCl=CH_2$ | 80 | 1-35/65-99 and 85-99/1-15 |
| Z-FO-1336mzz/$CF_3CCl=CH_2$ | 100 | 1-50/50-99 and 75-99/1-25 |
| Z-FO-1336mzz/$CF_3CCl=CH_2$ | 120 | 1-99/1-99 |
| Z-FO-1336mzz/$CF_3CCl=CH_2$ | 140 | 1-99/1-99 |

TABLE 5

Azeotrope-like compositions

| COMPONENTS | T (° C.) | Mole Percentage Range |
|---|---|---|
| Z-FO-1336mzz/$CF_3CCl=CH_2$ | −40 | 5-6/94-95 and 98-99/1-2 |
| Z-FO-1336mzz/$CF_3CCl=CH_2$ | −20 | 5-9/91-95 and 97-99/1-3 |
| Z-FO-1336mzz/$CF_3CCl=CH_2$ | 0 | 5-12/88-95 and 96-99/1-4 |
| Z-FO-1336mzz/$CF_3CCl=CH_2$ | 20 | 5-16/84-95 and 94-99/1-6 |
| Z-FO-1336mzz/$CF_3CCl=CH_2$ | 40 | 5-21/79-95 and 92-95/5-8 |
| Z-FO-1336mzz/$CF_3CCl=CH_2$ | 60 | 5-27/73-95 and 89-95/5-15 |
| Z-FO-1336mzz/$CF_3CCl=CH_2$ | 80 | 5-35/65-95 and 85-95/5-15 |
| Z-FO-1336mzz/$CF_3CCl=CH_2$ | 100 | 5-50/50-95 and 75-95/5-25 |
| Z-FO-1336mzz/$CF_3CCl=CH_2$ | 120 | 5-95/5-95 |
| Z-FO-1336mzz/$CF_3CCl=CH_2$ | 140 | 5-95/5-95 |

It was found through experiments that Z-FO-1336mzz and methanol ($CH_3OH$) form azeotropic or azeotrope-like compositions. To determine the relative volatility of this binary pair, the PTx method described above was used. The total absolute pressure in a PTx cell of known volume was measured at constant temperature for various binary compositions. These measurements were then reduced to equilibrium vapor and liquid compositions in the cell using the NRTL equation.

Figure 3:
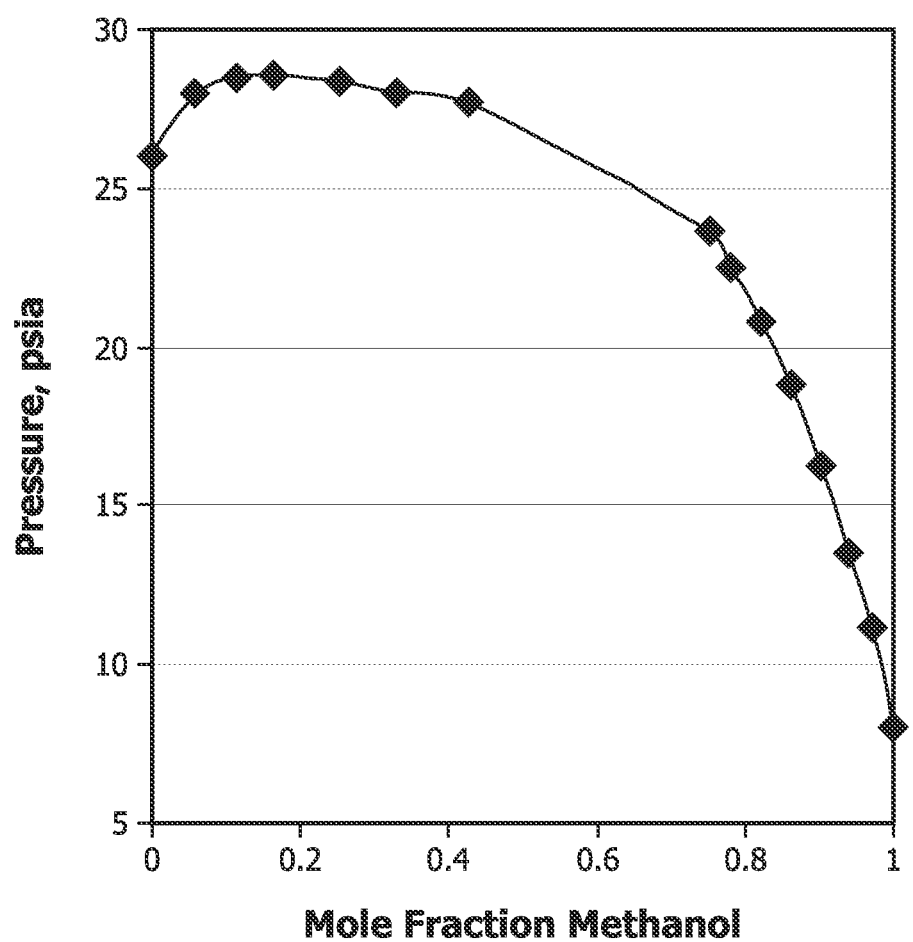
FIG. 3 is a graphical representation of an azeotrope and azeotrope-like compositions consisting essentially of Z-FO-1336mzz and methanol at a temperature of about 50.0° C.

The vapor pressure measured versus the compositions in the PTx cell for Z-FO-1336mzz/methanol mixture is shown in FIG. 3, which illustrates graphically the formation of an azeotrope and azeotrope-like compositions of Z-1,1,1,4,4,4-hexafluoro-2-butene and methanol at 50.0° C., as indicated by a mixture of about 82.8 mole % Z-1,1,1,4,4,4-hexafluoro-2-butene and 17.2 mole % methanol having the highest pressure over the range of compositions at this temperature.

Based upon these findings, it has been calculated that Z-FO-1336mzz and methanol form azeotropic compositions ranging from about 95.6 mole percent to about 70.4 mole percent Z-FO-1336mzz and from about 4.4 mole percent to about 29.6 mole percent methanol (which form azeotropic compositions boiling at a temperature of from about −40° C. to about 120° C. and at a pressure of from about 0.3 psia (2.1 kPa) to about 208 psia (1434 kPa)). Some embodiments of azeotropic compositions are listed in Table 6.

TABLE 6

Azeotropic compositions

| Azeotropic Temperature (° C.) | Azeotropic Pressure (psia) | Z-FO-1336mzz (mole %) | methanol (mole %) |
|---|---|---|---|
| 31.6 | 14.7 | 86.0 | 14.0 |
| 50.0 | 28.5 | 82.8 | 17.2 |

Additionally, azeotrope-like compositions containing Z-FO-1336mzz and methanol may also be formed. Such azeotrope-like compositions exist around azeotropic compositions. Some embodiments of azeotrope-like compositions are listed in Table 7. Additional embodiments of azeotrope-like compositions are listed in Table 8.

TABLE 7

Azeotrope-like compositions

| COMPONENTS | T (° C.) | Mole Percentage Range |
|---|---|---|
| Z-FO-1336mzz/methanol | −40 | 93-99/1-7 |
| Z-FO-1336mzz/methanol | −20 | 90-99/1-10 |
| Z-FO-1336mzz/methanol | 0 | 87-99/1-13 |
| Z-FO-1336mzz/methanol | 20 | 84-99/1-16 |
| Z-FO-1336mzz/methanol | 40 | 79-99/1-21 |
| Z-FO-1336mzz/methanol | 60 | 75-99/1-25 |
| Z-FO-1336mzz/methanol | 80 | 70-99/1-30 |
| Z-FO-1336mzz/methanol | 100 | 66-85/15-34 and 96-99/1-4 |
| Z-FO-1336mzz/methanol | 120 | 62-80/20-38 and 97-99/1-3 |

TABLE 8

Azeotrope-like compositions

| COMPONENTS | T (° C.) | Mole Percentage Range |
|---|---|---|
| Z-FO-1336mzz/methanol | −40 | 93-95/5-7 |
| Z-FO-1336mzz/methanol | −20 | 90-95/5-10 |
| Z-FO-1336mzz/methanol | 0 | 87-95/5-13 |
| Z-FO-1336mzz/methanol | 20 | 84-95/5-16 |
| Z-FO-1336mzz/methanol | 40 | 79-95/5-21 |
| Z-FO-1336mzz/methanol | 60 | 75-95/5-25 |
| Z-FO-1336mzz/methanol | 80 | 70-95/5-30 |
| Z-FO-1336mzz/methanol | 100 | 66-85/15-34 |
| Z-FO-1336mzz/methanol | 120 | 62-80/20-38 |

It was found through experiments that Z-FO-1336mzz and E-1,1,1,4,4,5,5,5-octafluoro-2-pentene (E-CF$_3$CH=CHCF$_2$CF$_3$, E-FO-1438mzz, trans-FO-1438mzz, E-HFO-1438mzz) form azeotropic or azeotrope-like compositions. To determine the relative volatility of this binary pair, the PTx method described above was used. The total absolute pressure in a PTx cell of known volume was measured at constant temperature for various binary compositions. These measurements were then reduced to equilibrium vapor and liquid compositions in the cell using the NRTL equation.

Figure 4:
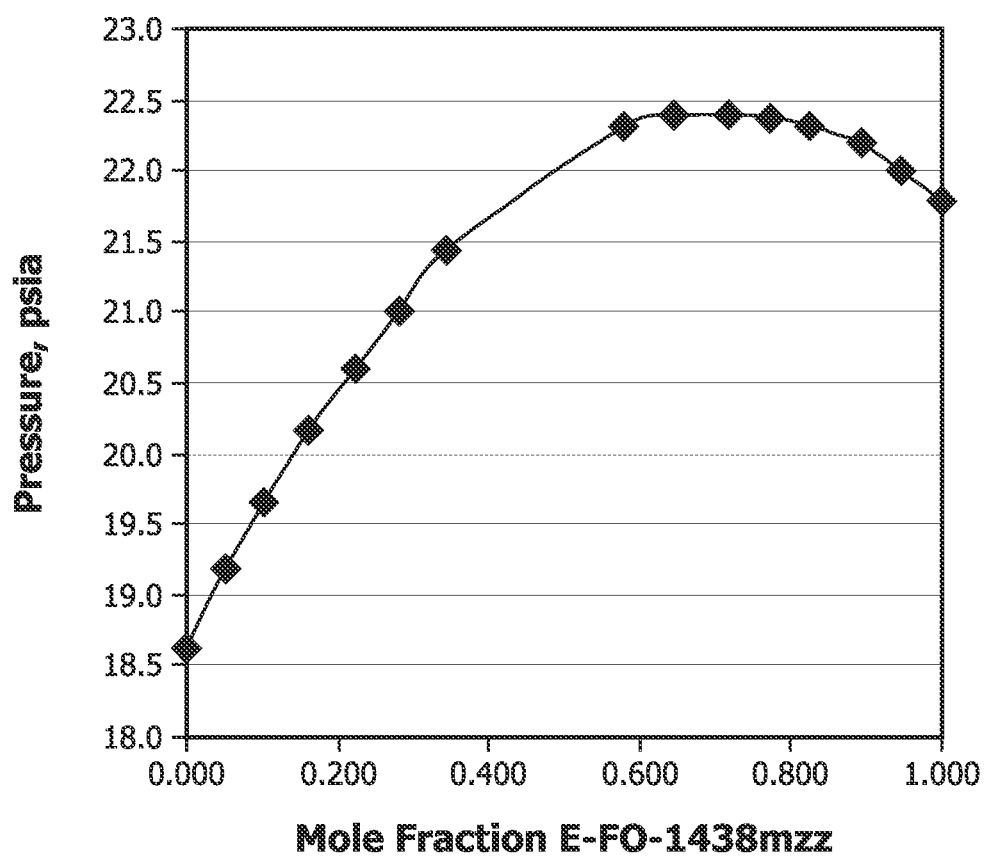
FIG. 4 is a graphical representation of an azeotrope and azeotrope-like compositions consisting essentially of Z-FO-1336mzz and E-1,1,1,4,4,5,5,5-octafluoro-2-pentene at a temperature of about 40.0° C.

The vapor pressure measured versus the compositions in the PTx cell for Z-FO-1336mzz/E-FO-1438mzz mixture is shown in FIG. 4, which illustrates graphically the formation of an azeotrope and azeotrope-like compositions of Z-1,1,1,4,4,4-hexafluoro-2-butene and E-FO-1438mzz at 40.0° C., as indicated by a mixture of about 26.2 mole % Z-1,1,1,4,4,4-hexafluoro-2-butene and 73.8 mole % E-FO-1438mzz having the highest pressure over the range of compositions at this temperature.

Based upon these findings, it has been calculated that Z-FO-1336mzz and E-FO-1438mzz form azeotropic compositions ranging from about 39.4 mole percent to about 17.5 mole percent Z-FO-1336mzz and from about 60.6 mole percent to about 82.5 mole percent E-FO-1438mzz (which form azeotropic compositions boiling at a temperature of from about −40° C. to about 140° C. and at a pressure of from about 0.4 psia (2.8 kPa) to about 281 psia (1937 kPa)). Some embodiments of azeotropic compositions are listed in Table 9.

TABLE 9

Azeotropic compositions

| Azeotropic Temperature (° C.) | Azeotropic Pressure (psia) | Z-FO-1336mzz (mole %) | E-FO-1438mzz (mole %) |
|---|---|---|---|
| 28.2 | 14.7 | 27.8 | 72.2 |
| 40.0 | 22.5 | 26.2 | 73.8 |

Additionally, azeotrope-like compositions containing Z-FO-1336mzz and E-FO-1438mzz may also be formed. Such azeotrope-like compositions exist around azeotropic compositions. Some embodiments of azeotrope-like compositions are listed in Table 10. Additional embodiments of azeotrope-like compositions are listed in Table 11.

TABLE 10

Azeotrope-like compositions

| COMPONENTS | T (° C.) | Mole Percentage Range |
|---|---|---|
| Z-FO-1336mzz/E-FO-1438mzz | −40 | 1-99/1-99 |
| Z-FO-1336mzz/E-FO-1438mzz | −20 | 1-99/1-99 |
| Z-FO-1336mzz/E-FO-1438mzz | 0 | 1-99/1-99 |
| Z-FO-1336mzz/E-FO-1438mzz | 20 | 1-99/1-99 |
| Z-FO-1336mzz/E-FO-1438mzz | 40 | 1-99/1-99 |
| Z-FO-1336mzz/E-FO-1438mzz | 60 | 1-99/1-99 |
| Z-FO-1336mzz/E-FO-1438mzz | 80 | 1-99/1-99 |
| Z-FO-1336mzz/E-FO-1438mzz | 100 | 1-99/1-99 |
| Z-FO-1336mzz/E-FO-1438mzz | 120 | 1-99/1-99 |

TABLE 11

Azeotrope-like compositions

| COMPONENTS | T (° C.) | Mole Percentage Range |
|---|---|---|
| Z-FO-1336mzz/E-FO-1438mzz | −40 | 5-95/5-95 |
| Z-FO-1336mzz/E-FO-1438mzz | −20 | 5-95/5-95 |
| Z-FO-1336mzz/E-FO-1438mzz | 0 | 5-95/5-95 |
| Z-FO-1336mzz/E-FO-1438mzz | 20 | 5-95/5-95 |
| Z-FO-1336mzz/E-FO-1438mzz | 40 | 5-95/5-95 |
| Z-FO-1336mzz/E-FO-1438mzz | 60 | 5-95/5-95 |
| Z-FO-1336mzz/E-FO-1438mzz | 80 | 5-95/5-95 |
| Z-FO-1336mzz/E-FO-1438mzz | 100 | 5-95/5-95 |
| Z-FO-1336mzz/E-FO-1438mzz | 120 | 5-95/5-95 |

It was found through experiments that Z-FO-1336mzz and 2-bromo-3,3,3-trifluoropropene (CF$_3$CBr=CH$_2$, HBFO-1233xfB, FO-1233xfB) form azeotropic or azeotrope-like compositions. To determine the relative volatility of this binary pair, the PTx method described above was used. The total absolute pressure in a PTx cell of known volume was measured at constant temperature for various binary compositions. These measurements were then reduced to equilibrium vapor and liquid compositions in the cell using the NRTL equation.

Figure 5:
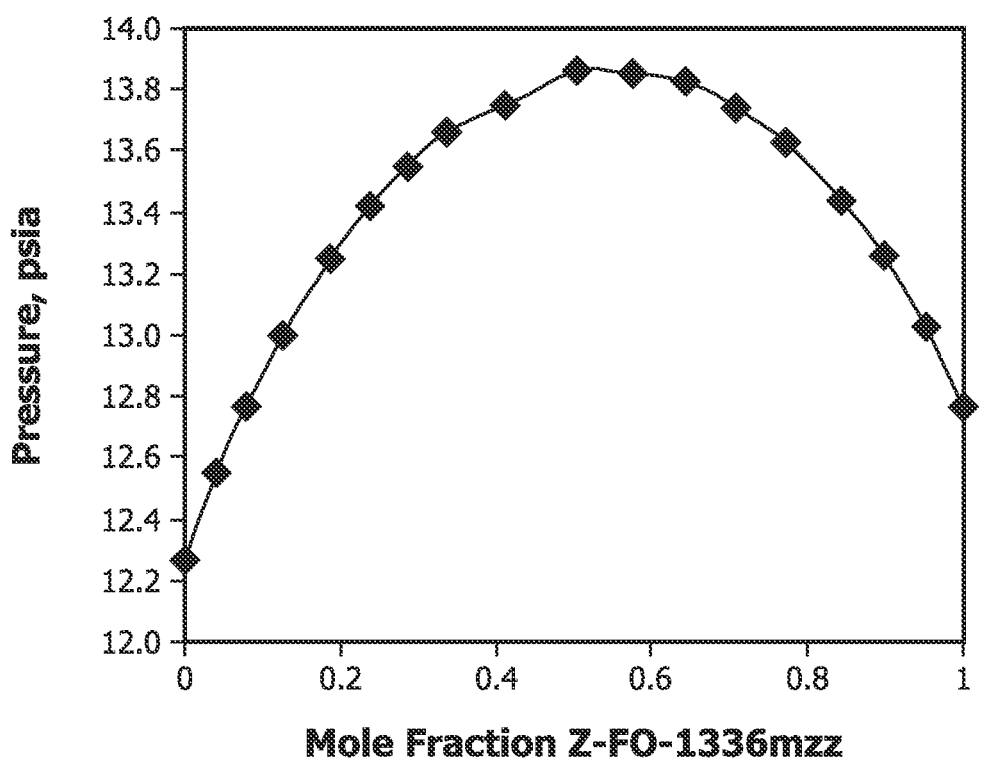
FIG. 5 is a graphical representation of an azeotrope and azeotrope-like compositions consisting essentially of Z-FO-1336mzz and 2-bromo-3,3,3-trifluoropropene at a temperature of about 29.6° C.

The vapor pressure measured versus the compositions in the PTx cell for Z-FO-1336mzz/HBFO-1233xfB mixture is shown in FIG. 5, which illustrates graphically the formation of an azeotrope and azeotrope-like compositions of Z-1,1,1,4,4,4-hexafluoro-2-butene and HBFO-1233xfB at 29.6° C., as indicated by a mixture of about 54.7 mole % Z-1,1,1,4,4,4-hexafluoro-2-butene and 45.3 mole % HBFO-1233xfB having the highest pressure over the range of compositions at this temperature.

Based upon these findings, it has been calculated that Z-FO-1336mzz and HBFO-1233xfB form azeotropic compositions ranging from about 41.2 mole percent to about 75.1 mole percent Z-FO-1336mzz and from about 58.8 mole percent to about 24.9 mole percent HBFO-1233xfB (which form azeotropic compositions boiling at a temperature of from about −50° C. to about 160° C. and at a pressure of from about 0.2 psia (1.4 kPa) to about 349 psia (2406 kPa)). Some embodiments of azeotropic compositions are listed in Table 12.

TABLE 12

Azeotropic compositions

| Azeotropic Temperature (° C.) | Azeotropic Pressure (psia) | Z-FO-1336mzz (mole %) | HBFO-1233xfB (mole %) |
|---|---|---|---|
| 29.6 | 13.9 | 54.7 | 45.3 |
| 31.2 | 14.7 | 55.0 | 45.0 |

Additionally, azeotrope-like compositions containing Z-FO-1336mzz and HBFO-1233xfB may also be formed. Such azeotrope-like compositions exist around azeotropic compositions. Some embodiments of azeotrope-like compositions are listed in Table 13. Additional embodiments of azeotrope-like compositions are listed in Table 14.

TABLE 13

Azeotrope-like compositions

| COMPONENTS | T (° C.) | Mole Percentage Range |
|---|---|---|
| Z-FO-1336mzz/HBFO-1233xfB | −50 | 1-99/1-99 |
| Z-FO-1336mzz/HBFO-1233xfB | −40 | 1-99/1-99 |
| Z-FO-1336mzz/HBFO-1233xfB | −20 | 1-99/1-99 |
| Z-FO-1336mzz/HBFO-1233xfB | 0 | 1-99/1-99 |
| Z-FO-1336mzz/HBFO-1233xfB | 20 | 1-99/1-99 |
| Z-FO-1336mzz/HBFO-1233xfB | 40 | 1-99/1-99 |
| Z-FO-1336mzz/HBFO-1233xfB | 60 | 1-99/1-99 |
| Z-FO-1336mzz/HBFO-1233xfB | 80 | 1-99/1-99 |
| Z-FO-1336mzz/HBFO-1233xfB | 100 | 1-99/1-99 |
| Z-FO-1336mzz/HBFO-1233xfB | 120 | 1-99/1-99 |
| Z-FO-1336mzz/HBFO-1233xfB | 140 | 1-99/1-99 |
| Z-FO-1336mzz/HBFO-1233xfB | 160 | 1-99/1-99 |

TABLE 14

Azeotrope-like compositions

| COMPONENTS | T (° C.) | Mole Percentage Range |
|---|---|---|
| Z-FO-1336mzz/HBFO-1233xfB | −50 | 5-95/5-95 |
| Z-FO-1336mzz/HBFO-1233xfB | −40 | 5-95/5-95 |
| Z-FO-1336mzz/HBFO-1233xfB | −20 | 5-95/5-95 |
| Z-FO-1336mzz/HBFO-1233xfB | 0 | 5-95/5-95 |
| Z-FO-1336mzz/HBFO-1233xfB | 20 | 5-95/5-95 |
| Z-FO-1336mzz/HBFO-1233xfB | 40 | 5-95/5-95 |
| Z-FO-1336mzz/HBFO-1233xfB | 60 | 5-95/5-95 |
| Z-FO-1336mzz/HBFO-1233xfB | 80 | 5-95/5-95 |
| Z-FO-1336mzz/HBFO-1233xfB | 100 | 5-95/5-95 |
| Z-FO-1336mzz/HBFO-1233xfB | 120 | 5-95/5-95 |
| Z-FO-1336mzz/HBFO-1233xfB | 140 | 5-95/5-95 |
| Z-FO-1336mzz/HBFO-1233xfB | 160 | 5-95/5-95 |

It was found through experiments that Z-FO-1336mzz and methyl acetate (CH$_3$C(O)OCH$_3$) form azeotrope-like compositions. To determine the relative volatility of this binary pair, the PTx method described above was used. The total absolute pressure in a PTx cell of known volume was measured at constant temperature for various binary compositions. These measurements were then reduced to equilibrium vapor and liquid compositions in the cell using the NRTL equation.

Figure 6:
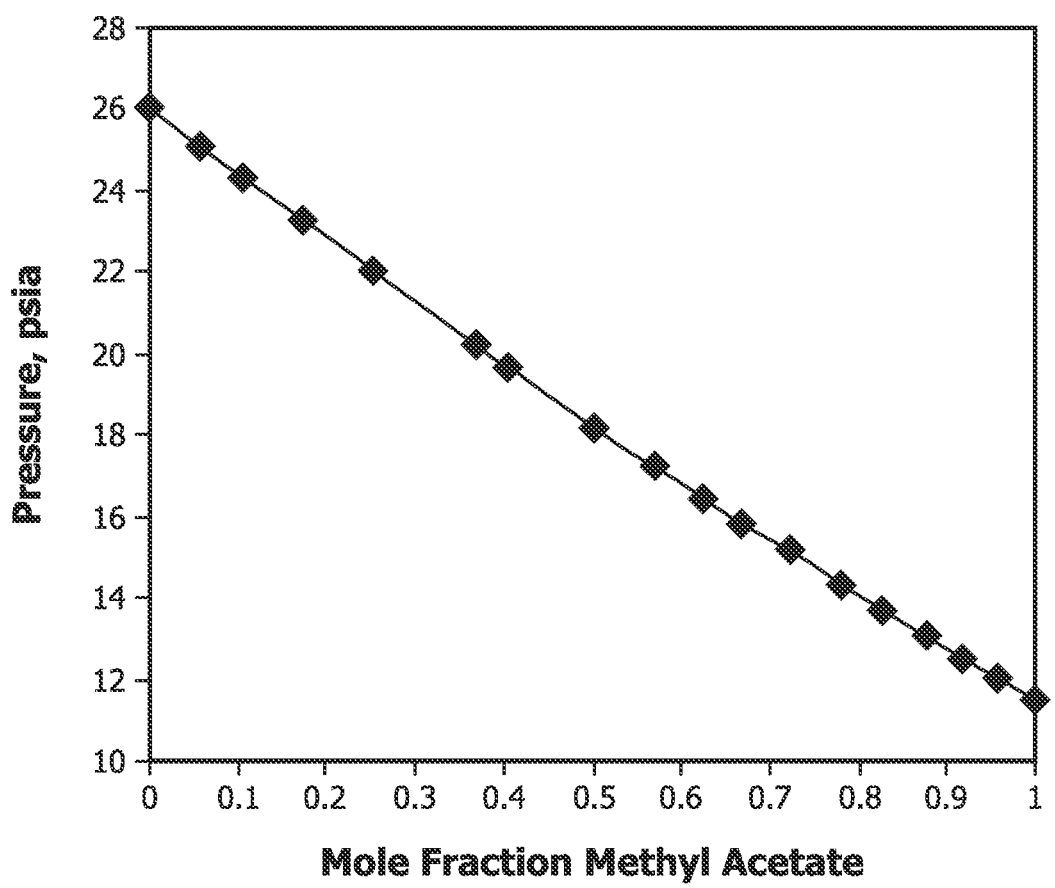
FIG. 6 is a graphical representation of azeotrope-like compositions consisting essentially of Z-FO-1336mzz and methyl acetate at a temperature of about 50.0° C.

The vapor pressure measured versus the compositions in the PTx cell for Z-FO-1336mzz/methyl acetate mixture is shown in FIG. 6, which illustrates graphically the formation of azeotrope-like compositions consisting essentially of from about 1 to about 10 mole % Z-1,1,1,4,4,4-hexafluoro-2-butene and from about 99 to about 90 mole % methyl acetate at about 50.0° C. and about 12 psia (83 kPa). FIG. 6 also illustrates graphically the formation of azeotrope-like compositions consisting essentially of from about 93 to about 99 mole % Z-1,1,1,4,4,4-hexafluoro-2-butene and from about 7 to about 1 mole % methyl acetate at about 50.0° C. and about 25 psia (173 kPa).

Some embodiments of azeotrope-like compositions are listed in Table 15. Additional embodiments of azeotrope-like compositions are listed in Table 16.

TABLE 15

Azeotrope-like compositions

| COMPONENTS | T (° C.) | Mole Percentage Range |
|---|---|---|
| Z-FO-1336mzz/methyl acetate | −40 | 1-3/97-99 |
| Z-FO-1336mzz/methyl acetate | −20 | 1-4/96-99 |
| Z-FO-1336mzz/methyl acetate | 0 | 1-5/95-99 |
| Z-FO-1336mzz/methyl acetate | 20 | 1-7/93-99 and 95-99/1-5 |
| Z-FO-1336mzz/methyl acetate | 40 | 1-9/91-99 and 94-99/1-6 |
| Z-FO-1336mzz/methyl acetate | 50 | 1-10/90-99 and 93-99/1-7 |
| Z-FO-1336mzz/methyl acetate | 60 | 1-12/88-99 and 92-99/1-8 |
| Z-FO-1336mzz/methyl acetate | 80 | 1-15/85-99 and 89-99/1-11 |
| Z-FO-1336mzz/methyl acetate | 100 | 1-21/79-99 and 85-99/1-15 |
| Z-FO-1336mzz/methyl acetate | 120 | 1-29/71-99 and 79-99/1-21 |
| Z-FO-1336mzz/methyl acetate | 140 | 1-51/49-99 and 63-99/1-47 |

TABLE 16

Azeotrope-like compositions

| COMPONENTS | T (° C.) | Mole Percentage Range |
|---|---|---|
| Z-FO-1336mzz/methyl acetate | −40 | 1-3/97-99 |
| Z-FO-1336mzz/methyl acetate | −20 | 1-4/96-99 |
| Z-FO-1336mzz/methyl acetate | 0 | 1-5/95-99 |
| Z-FO-1336mzz/methyl acetate | 20 | 5-7/93-95 and 95-99/1-5 |
| Z-FO-1336mzz/methyl acetate | 40 | 5-9/91-95 and 94-95/5-6 |
| Z-FO-1336mzz/methyl acetate | 50 | 5-10/95-99 and 93-95/5-7 |
| Z-FO-1336mzz/methyl acetate | 60 | 5-12/88-95 and 92-95/5-8 |
| Z-FO-1336mzz/methyl acetate | 80 | 5-15/85-95 and 89-95/5-11 |
| Z-FO-1336mzz/methyl acetate | 100 | 5-21/70-95 and 85-95/5-15 |
| Z-FO-1336mzz/methyl acetate | 120 | 5-29/71-95 and 79-95/5-21 |
| Z-FO-1336mzz/methyl acetate | 140 | 5-51/49-95 and 63-95/5-37 |

It was found through experiments that Z-FO-1336mzz and acetone (CH$_3$C(O)CH$_3$) form azeotrope-like compositions. To determine the relative volatility of this binary pair, the PTx method described above was used. The total absolute pressure in a PTx cell of known volume was measured at constant temperature for various binary compositions. These measurements were then reduced to equilibrium vapor and liquid compositions in the cell using the NRTL equation.

Figure 7:
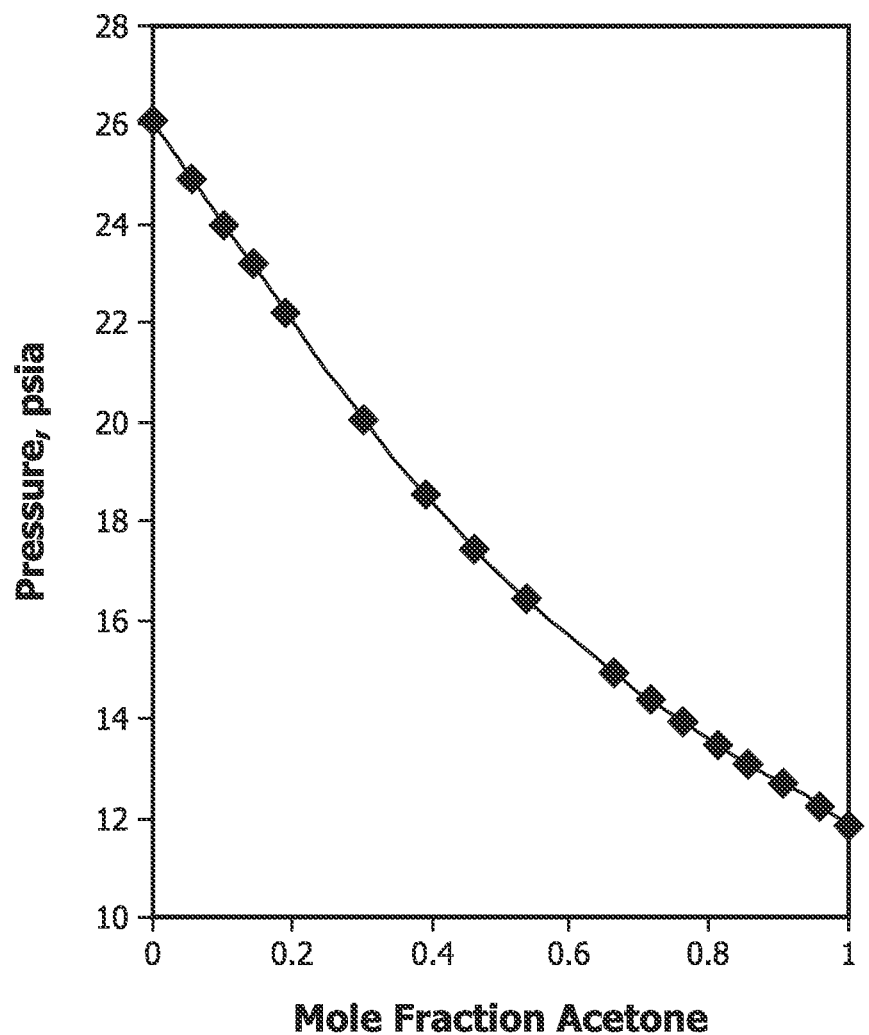
FIG. 7—FIG. 7 is a graphical representation of azeotrope-like compositions consisting essentially of Z-FO-1336mzz and acetone at a temperature of about 50.0° C.

The vapor pressure measured versus the compositions in the PTx cell for Z-FO-1336mzz/acetone mixture is shown in FIG. 7, which illustrates graphically the formation of azeotrope-like compositions consisting essentially of from about 1 to about 23 mole % Z-1,1,1,4,4,4-hexafluoro-2-butene and from about 99 to about 77 mole % acetone at about 50.0° C. and about 13 psia (90 kPa).

Some embodiments of azeotrope-like compositions are listed in Table 17. Additional embodiments of azeotrope-like compositions are listed in Table 18.

TABLE 17

Azeotrope-like compositions

| COMPONENTS | T (° C.) | Mole Percentage Range |
|---|---|---|
| Z-FO-1336mzz/acetone | −40 | 1-14/86-99 |
| Z-FO-1336mzz/acetone | −20 | 1-14/86-99 |
| Z-FO-1336mzz/acetone | 0 | 1-15/85-99 |
| Z-FO-1336mzz/acetone | 20 | 1-17/83-99 |
| Z-FO-1336mzz/acetone | 40 | 1-21/79-99 |
| Z-FO-1336mzz/acetone | 50 | 1-23/77-99 |
| Z-FO-1336mzz/acetone | 60 | 1-25/75-99 |
| Z-FO-1336mzz/acetone | 80 | 1-31/69-99 |
| Z-FO-1336mzz/acetone | 100 | 1-39/61-99 |
| Z-FO-1336mzz/acetone | 120 | 1-49/51-99 |
| Z-FO-1336mzz/acetone | 140 | 1-61/39-99 |

TABLE 18

Azeotrope-like compositions

| COMPONENTS | T (° C.) | Mole Percentage Range |
|---|---|---|
| Z-FO-1336mzz/acetone | −40 | 5-14/86-95 |
| Z-FO-1336mzz/acetone | −20 | 5-14/86-95 |
| Z-FO-1336mzz/acetone | 0 | 5-15/85-95 |
| Z-FO-1336mzz/acetone | 20 | 5-17/83-95 |
| Z-FO-1336mzz/acetone | 40 | 5-21/79-95 |
| Z-FO-1336mzz/acetone | 50 | 5-23/77-95 |
| Z-FO-1336mzz/acetone | 60 | 5-25/75-95 |
| Z-FO-1336mzz/acetone | 80 | 5-31/69-95 |
| Z-FO-1336mzz/acetone | 100 | 5-39/61-95 |
| Z-FO-1336mzz/acetone | 120 | 5-49/51-95 |
| Z-FO-1336mzz/acetone | 140 | 5-61/39-95 |

It was found through experiments that Z-FO-1336mzz and chloroform ($CHCl_3$) form azeotropic or azeotrope-like compositions. To determine the relative volatility of this binary pair, the PTx method described above was used. The total absolute pressure in a PTx cell of known volume was measured at constant temperature for various binary compositions. These measurements were then reduced to equilibrium vapor and liquid compositions in the cell using the NRTL equation.

Figure 8:
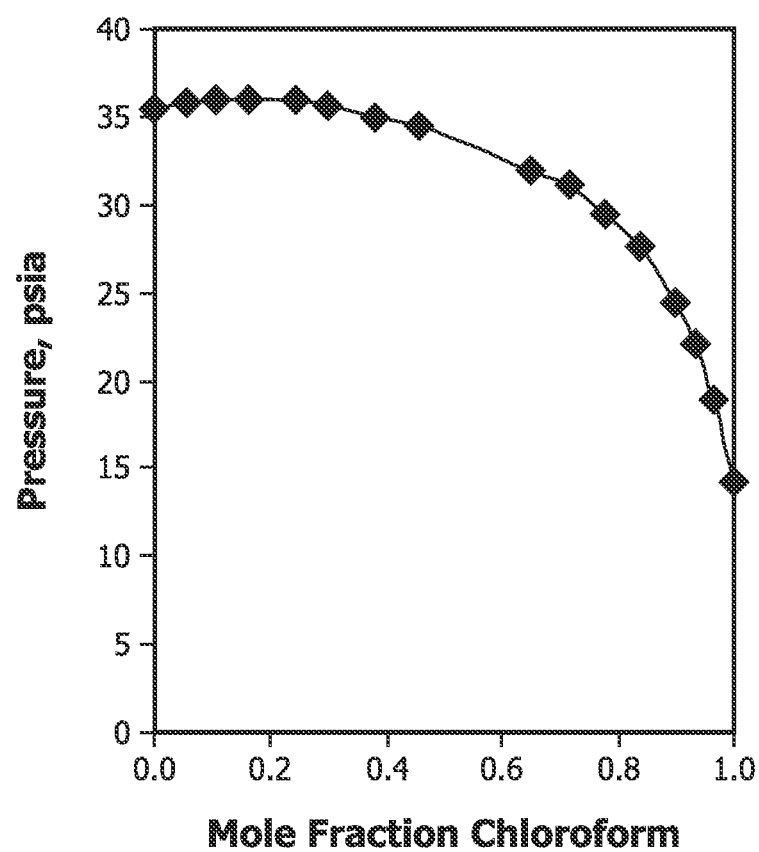
FIG. 8—FIG. 8 is a graphical representation of an azeotrope and azeotrope-like compositions consisting essentially of Z-FO-1336mzz and chloroform at a temperature of about 60.0° C.

The vapor pressure measured versus the compositions in the PTx cell for Z-FO-1336mzz/chloroform mixture is shown in FIG. 8, which illustrates graphically the formation of an azeotropic composition of Z-1,1,1,4,4,4-hexafluoro-2-butene and chloroform at 60.0° C., as indicated by a mixture of about 86.3 mole % Z-1,1,1,4,4,4-hexafluoro-2-butene and 13.7 mole % chloroform having the highest pressure over the range of compositions at this temperature.

Based upon these findings, it has been calculated that Z-FO-1336mzz and chloroform form azeotropic compositions ranging from about 79.1 mole percent to about 93.8 mole percent Z-FO-1336mzz and from about 20.9 mole percent to about 6.2 mole percent chloroform (which form azeotropic compositions boiling at a temperature of from about −40° C. to about 140° C. and at a pressure of from about 0.4 psia (2.7 kPa) to about 238 psia (1641 kPa)). Some embodiments of azeotropic compositions are listed in Table 19.

TABLE 19

Azeotropic compositions

| Azeotropic Temperature (° C.) | Azeotropic Pressure (psia) | Z-FO-1336mzz (mole %) | Chloroform (mole %) |
|---|---|---|---|
| 32.6 | 14.7 | 84.1 | 15.9 |
| 60.0 | 36.2 | 86.3 | 13.7 |

Additionally, azeotrope-like compositions containing Z-FO-1336mzz and chloroform may also be formed. Such azeotrope-like compositions exist around azeotropic compositions. Some embodiments of azeotrope-like compositions are listed in Table 20. Additional embodiments of azeotrope-like compositions are listed in Table 21.

TABLE 20

Azeotrope-like compositions

| COMPONENTS | T (° C.) | Mole Percentage Range |
|---|---|---|
| Z-FO-1336mzz/chloroform | −40 | 74-99/1-26 |
| Z-FO-1336mzz/chloroform | −20 | 73-99/1-27 |
| Z-FO-1336mzz/chloroform | 0 | 71-99/1-29 |
| Z-FO-1336mzz/chloroform | 20 | 70-99/1-30 |
| Z-FO-1336mzz/chloroform | 40 | 69-99/1-31 |
| Z-FO-1336mzz/chloroform | 60 | 67-99/1-33 |
| Z-FO-1336mzz/chloroform | 80 | 66-99/1-34 |
| Z-FO-1336mzz/chloroform | 100 | 64-99/1-36 |
| Z-FO-1336mzz/chloroform | 120 | 62-99/1-38 |
| Z-FO-1336mzz/chloroform | 140 | 60-99/1-40 |

TABLE 21

Azeotrope-like compositions

| COMPONENTS | T (° C.) | Mole Percentage Range |
|---|---|---|
| Z-FO-1336mzz/chloroform | −40 | 74-95/5-26 |
| Z-FO-1336mzz/chloroform | −20 | 73-95/5-27 |
| Z-FO-1336mzz/chloroform | 0 | 71-95/5-29 |
| Z-FO-1336mzz/chloroform | 20 | 70-95/5-30 |
| Z-FO-1336mzz/chloroform | 40 | 69-95/5-31 |
| Z-FO-1336mzz/chloroform | 60 | 67-95/5-33 |
| Z-FO-1336mzz/chloroform | 80 | 66-95/5-34 |
| Z-FO-1336mzz/chloroform | 100 | 64-95/5-36 |
| Z-FO-1336mzz/chloroform | 120 | 62-95/5-38 |
| Z-FO-1336mzz/chloroform | 140 | 60-95/5-40 |

It was found through experiments that Z-FO-1336mzz and n-hexane ($CH_3CH_2CH_2CH_2CH_2CH_3$) form azeotropic or azeotrope-like compositions. To determine the relative volatility of this binary pair, the PTx method described above was used. The total absolute pressure in a PTx cell of known volume was measured at constant temperature for various binary compositions. These measurements were then reduced to equilibrium vapor and liquid compositions in the cell using the NRTL equation.

Figure 9:
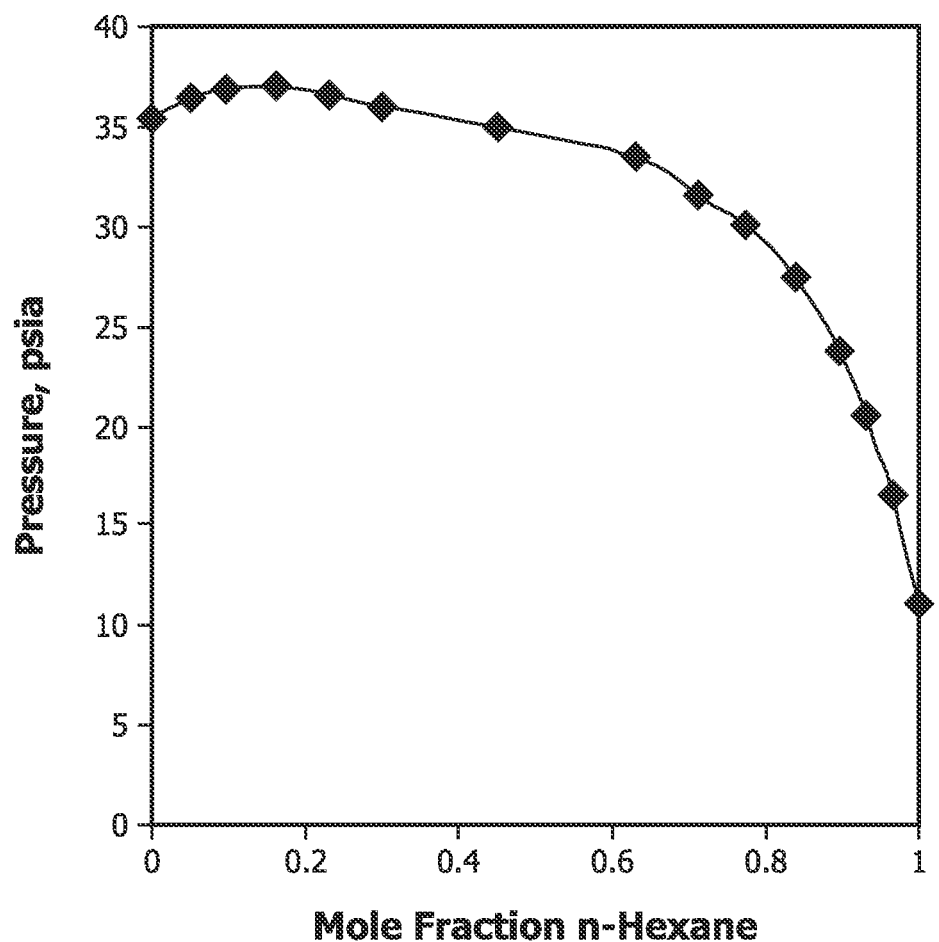
FIG. 9 is a graphical representation of an azeotrope and azeotrope-like compositions consisting essentially of Z-FO-1336mzz and n-hexane at a temperature of about 60.0° C.

The vapor pressure measured versus the compositions in the PTx cell for Z-FO-1336mzz/n-hexane mixture is shown in FIG. 9, which illustrates graphically the formation of an azeotropic composition of Z-1,1,1,4,4,4-hexafluoro-2-butene and n-hexane at 60.0° C., as indicated by a mixture of about 84.9 mole % Z-1,1,1,4,4,4-hexafluoro-2-butene and 15.1 mole % n-hexane having the highest pressure over the range of compositions at this temperature.

Based upon these findings, it has been calculated that Z-FO-1336mzz and n-hexane form azeotropic compositions ranging from about 81.2 mole percent to about 96.0 mole percent Z-FO-1336mzz and from about 18.8 mole percent to about 4.0 mole percent n-hexane (which form azeotropic compositions boiling at a temperature of from about −40° C. to about 140° C. and at a pressure of from about 0.4 psia (2.7 kPa) to about 237 psia (1634 kPa)). Some embodiments of azeotropic compositions are listed in Table 22.

TABLE 22

Azeotropic compositions

| Azeotropic Temperature (° C.) | Azeotropic Pressure (psia) | Z-FO-1336mzz (mole %) | n-Hexane (mole %) |
|---|---|---|---|
| 31.7 | 14.7 | 82.7 | 17.3 |
| 60.0 | 36.9 | 84.9 | 15.1 |

Additionally, azeotrope-like compositions containing Z-FO-1336mzz and n-hexane may also be formed. Such azeotrope-like compositions exist around azeotropic compositions. Some embodiments of azeotrope-like compositions are listed in Table 23. Additional embodiments of azeotrope-like compositions are listed in Table 24.

TABLE 23

Azeotrope-like compositions

| COMPONENTS | T (° C.) | Mole Percentage Range |
|---|---|---|
| Z-FO-1336mzz/n-hexane | −40 | 83-99/1-17 |
| Z-FO-1336mzz/n-hexane | −20 | 81-99/1-19 |
| Z-FO-1336mzz/n-hexane | 0 | 79-99/1-21 |
| Z-FO-1336mzz/n-hexane | 20 | 76-99/1-24 |
| Z-FO-1336mzz/n-hexane | 40 | 75-99/1-25 |
| Z-FO-1336mzz/n-hexane | 60 | 73-99/1-27 |
| Z-FO-1336mzz/n-hexane | 80 | 72-99/1-28 |
| Z-FO-1336mzz/n-hexane | 100 | 72-99/1-28 |
| Z-FO-1336mzz/n-hexane | 120 | 71-99/1-29 |
| Z-FO-1336mzz/n-hexane | 140 | 69-99/1-31 |

TABLE 24

Azeotrope-like compositions

| COMPONENTS | T (° C.) | Mole Percentage Range |
|---|---|---|
| Z-FO-1336mzz/n-hexane | −40 | 83-95/5-17 |
| Z-FO-1336mzz/n-hexane | −20 | 81-95/5-19 |
| Z-FO-1336mzz/n-hexane | 0 | 79-95/5-21 |
| Z-FO-1336mzz/n-hexane | 20 | 76-95/5-24 |
| Z-FO-1336mzz/n-hexane | 40 | 75-95/5-25 |
| Z-FO-1336mzz/n-hexane | 60 | 73-95/5-27 |
| Z-FO-1336mzz/n-hexane | 80 | 72-95/5-28 |
| Z-FO-1336mzz/n-hexane | 100 | 72-95/5-28 |
| Z-FO-1336mzz/n-hexane | 120 | 71-95/5-29 |
| Z-FO-1336mzz/n-hexane | 140 | 69-95/5-31 |

It was found through experiments that Z-FO-1336mzz and 1-chloro-3,3,3-trifluoropropene ($CF_3CH=CHCl$, HCFO-1233zd) form azeotrope-like compositions. To determine the relative volatility of this binary pair, the PTx method described above was used. The total absolute pressure in a PTx cell of known volume was measured at constant temperature for various binary compositions. These measurements were then reduced to equilibrium vapor and liquid compositions in the cell using the NRTL equation.

Figure 10:
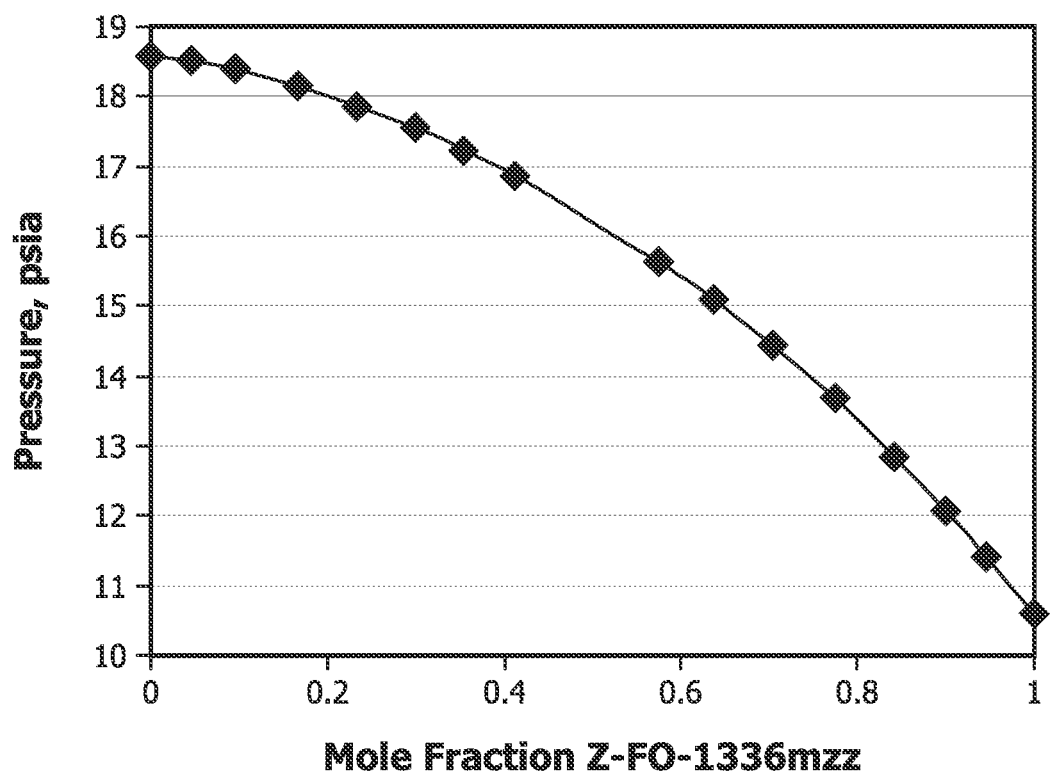
FIG. 10 is a graphical representation of azeotrope-like compositions consisting essentially of Z-FO-1336mzz and 1-chloro-3,3,3-trifluoropropene at a temperature of about 24.7° C.

The vapor pressure measured versus the compositions in the PTx cell for Z-FO-1336mzz/HCFO-1233zd mixture is shown in FIG. 10, which illustrates graphically the formation of azeotrope-like compositions consisting essentially of from about 1 to about 35 mole % Z-1,1,1,4,4,4-hexafluoro-2-butene and from about 99 to about 65 mole % HCFO-1233zd at about 24.7° C. and about 17.5 psia (121 kPa). FIG. 10 also illustrates graphically the formation of azeotrope-like compositions consisting essentially of from about 94 to about 99 mole % Z-1,1,1,4,4,4-hexafluoro-2-butene and from about 6 to about 1 mole % HCFO-1233zd at about 24.7° C. and about 11 psia (76 kPa).

Some embodiments of azeotrope-like compositions are listed in Table 25. Additional embodiments of azeotrope-like compositions are listed in Table 26.

TABLE 25

Azeotrope-like compositions

| COMPONENTS | T (° C.) | Mole Percentage Range |
|---|---|---|
| Z-FO-1336mzz/HCFO-1233zd | −40 | 1-24/76-99 and 96-99/1-4 |
| Z-FO-1336mzz/HCFO-1233zd | −20 | 1-25/75-99 and 95-99/1-5 |
| Z-FO-1336mzz/HCFO-1233zd | 0 | 1-28/72-99 and 95-99/1-5 |
| Z-FO-1336mzz/HCFO-1233zd | 20 | 1-34/64-99 and 93-99/1-7 |
| Z-FO-1336mzz/HCFO-1233zd | 40 | 1-40/60-99 and 91-99/1-9 |
| Z-FO-1336mzz/HCFO-1233zd | 60 | 1-48/52-99 and 89-99/1-11 |
| Z-FO-1336mzz/HCFO-1233zd | 80 | 1-56/44-99 and 85-99/1-15 |
| Z-FO-1336mzz/HCFO-1233zd | 100 | 1-63/37-99 and 82-99/1-18 |
| Z-FO-1336mzz/HCFO-1233zd | 120 | 1-66/34-99 and 81-99/1-19 |
| Z-FO-1336mzz/HCFO-1233zd | 140 | 1-64/36-99 and 84-99/1-16 |

TABLE 26

Azeotrope-like compositions

| COMPONENTS | T (° C.) | Mole Percentage Range |
|---|---|---|
| Z-FO-1336mzz/HCFO-1233zd | −40 | 5-24/76-95 and 96-99/1-4 |
| Z-FO-1336mzz/HCFO-1233zd | −20 | 5-25/75-95 and 95-99/1-5 |
| Z-FO-1336mzz/HCFO-1233zd | 0 | 5-28/72-95 and 95-99/1-5 |
| Z-FO-1336mzz/HCFO-1233zd | 20 | 5-34/64-95 and 93-95/5-7 |
| Z-FO-1336mzz/HCFO-1233zd | 40 | 5-40/60-95 and 91-95/5-9 |
| Z-FO-1336mzz/HCFO-1233zd | 60 | 5-48/52-95 and 89-95/5-11 |
| Z-FO-1336mzz/HCFO-1233zd | 80 | 5-56/44-95 and 85-95/5-15 |
| Z-FO-1336mzz/HCFO-1233zd | 100 | 5-63/37-95 and 82-95/5-18 |

TABLE 26-continued

Azeotrope-like compositions

| COMPONENTS | T (° C.) | Mole Percentage Range |
|---|---|---|
| Z-FO-1336mzz/HCFO-1233zd | 120 | 5-66/34-95 and 81-95/5-19 |
| Z-FO-1336mzz/HCFO-1233zd | 140 | 5-64/36-95 and 84-95/5-16 |

The azeotropic or azeotrope-like compositions of the present invention can be prepared by any convenient method including mixing or combining the desired amounts. In one embodiment of this invention, an azeotropic or azeotrope-like composition can be prepared by weighing the desired component amounts and thereafter combining them in an appropriate container.

The azeotropic or azeotrope-like compositions of the present invention can be used in a wide range of applications, including their use as aerosol propellants, refrigerants, solvents, cleaning agents, blowing agents (foam expansion agents) for thermoplastic and thermoset foams, heat transfer media, gaseous dielectrics, fire extinguishing and suppression agents, power cycle working fluids, polymerization media, particulate removal fluids, carrier fluids, buffing abrasive agents, and displacement drying agents.

One embodiment of this invention provides a process for preparing a thermoplastic or thermoset foam. The process comprises using an azeotropic or azeotrope-like composition as a blowing agent, wherein said azeotropic or azeotrope-like composition consists essentially of Z-1,1,1,4,4,4-hexafluoro-2-butene and a component selected from the group consisting of ethanol, 2-chloro-3,3,3-trifluoropropene, methanol, E-1,1,1,4,4,5,5,5-octafluoro-2-pentene, 2-bromo-3,3,3-trifluoropropene, methyl acetate, acetone, chloroform, n-hexane and 1-chloro-3,3,3-trifluoropropene.

Another embodiment of this invention provides a process for producing refrigeration. The process comprises condensing an azeotropic or azeotrope-like composition and thereafter evaporating said azeotropic or azeotrope-like composition in the vicinity of the body to be cooled, wherein said azeotropic or azeotrope-like composition consists essentially of Z-1,1,1,4,4,4-hexafluoro-2-butene and a component selected from the group consisting of ethanol, 2-chloro-3,3,3-trifluoropropene, methanol, E-1,1,1,4,4,5,5,5-octafluoro-2-pentene, 2-bromo-3,3,3-trifluoropropene, methyl acetate, acetone, chloroform, n-hexane and 1-chloro-3,3,3-trifluoropropene.

Another embodiment of this invention provides a process using an azeotropic or azeotrope-like composition as a solvent, wherein said azeotropic or azeotrope-like composition consists essentially of Z-1,1,1,4,4,4-hexafluoro-2-butene and a component selected from the group consisting of ethanol, 2-chloro-3,3,3-trifluoropropene, methanol, E-1,1,1,4,4,5,5,5-octafluoro-2-pentene, 2-bromo-3,3,3-trifluoropropene, methyl acetate, acetone, chloroform, n-hexane and 1-chloro-3,3,3-trifluoropropene.

Another embodiment of this invention provides a process for producing an aerosol product. The process comprises using an azeotropic or azeotrope-like composition as a propellant, wherein said azeotropic or azeotrope-like composition consists essentially of Z-1,1,1,4,4,4-hexafluoro-2-butene and a component selected from the group consisting of ethanol, 2-chloro-3,3,3-trifluoropropene, methanol, E-1,1,1,4,4,5,5,5-octafluoro-2-pentene, 2-bromo-3,3,3-trifluoropropene, methyl acetate, acetone, chloroform, n-hexane and 1-chloro-3,3,3-trifluoropropene.

Another embodiment of this invention provides a process using an azeotropic or azeotrope-like composition as a heat transfer media, wherein said azeotropic or azeotrope-like composition consists essentially of Z-1,1,1,4,4,4-hexafluoro-2-butene and a component selected from the group consisting of ethanol, 2-chloro-3,3,3-trifluoropropene, methanol, E-1,1,1,4,4,5,5,5-octafluoro-2-pentene, 2-bromo-3,3,3-trifluoropropene, methyl acetate, acetone, chloroform, n-hexane and 1-chloro-3,3,3-trifluoropropene.

Another embodiment of this invention provides a process for extinguishing or suppressing a fire. The process comprises using an azeotropic or azeotrope-like composition as a fire extinguishing or suppression agent, wherein said azeotropic or azeotrope-like composition consists essentially of Z-1,1,1,4,4,4-hexafluoro-2-butene and a component selected from the group consisting of ethanol, 2-chloro-3,3,3-trifluoropropene, methanol, E-1,1,1,4,4,5,5,5-octafluoro-2-pentene, 2-bromo-3,3,3-trifluoropropene, methyl acetate, acetone, chloroform, n-hexane and 1-chloro-3,3,3-trifluoropropene.

Another embodiment of this invention provides a process using an azeotropic or azeotrope-like composition as dielectrics, wherein said azeotropic or azeotrope-like composition consists essentially of Z-1,1,1,4,4,4-hexafluoro-2-butene and a component selected from the group consisting of ethanol, 2-chloro-3,3,3-trifluoropropene, methanol, E-1,1,1,4,4,5,5,5-octafluoro-2-pentene, 2-bromo-3,3,3-trifluoropropene, methyl acetate, acetone, chloroform, n-hexane and 1-chloro-3,3,3-trifluoropropene.

The invention claimed is:
1. A composition consisting essentially of:
(a) Z-1,1,1,4,4,4-hexafluoro-2-butene; and
(b) a component selected from the group consisting of:
(i) 1-27 mole percent ethanol, wherein the composition comprises ethanol, and wherein the component forms an azeotrope-like mixture with Z-1,1,1,4,4,4-hexafluoro-2-butene;
(ii) 1-99 mole percent 2-chloro-3,3,3-trifluoropropene, wherein the component forms an azeotrope-like combination with Z-1,1,1,4,4,4-hexafluoro-2-butene;
(iii) 1-38 mole percent methanol, wherein the component forms an azeotrope-like mixture with Z-1,1,1,4,4,4-hexafluoro-2-butene;
(v) 1-99 mole percent 2-bromo-3,3,3-trifluoropropene wherein the component forms an azeotrope-like mixture with Z-1,1,1,4,4,4-hexafluoro-2-butene;
(vi) 49-99 mole percent methyl acetate, wherein the component forms an azeotrope-like mixture with Z-1,1,1,4,4,4-hexafluoro-2-butene;
(vii) 1-47 mole percent methyl acetate, wherein the component forms an azeotrope-like mixture with Z-1,1,1,4,4,4-hexafluoro-2-butene;
(viii) 39-99 mole percent acetone, wherein the component forms an azeotrope-like mixture with Z-1,1,1,4,4,4-hexafluoro-2-butene;
(ix) 1-40 mole percent chloroform wherein the component forms an azeotrope-like mixture with Z-1,1,1,4,4,4-hexafluoro-2-butene;
(x) 1-31 mole percent n-hexane wherein the component forms an azeotrope-like mixture with Z-1,1,1,4,4,4-hexafluoro-2-butene;
(xi) 36-99 mole percent 1-chloro-3,3,3-trifluoropropene wherein the component forms an azeotrope-like mixture with Z-1,1,1,4,4,4-hexafluoro-2-butene; and

(xii) 1-19 mole percent 1-chloro-3,3,3-trifluoropropene,
wherein the component forms an azetrope-like mixture with Z-1,1,1,4,4,4-hexafluoro-2-butene.

2. A composition consisting essentially of:
(a) Z-1,1,1,4,4,4-hexafluoro-2-butene; and
(b) a component selected from the group consisting of
(i) 3.9-11.5 mole percent ethanol,
(ii) 4.4-29.6 mole percent methanol,
(iv) 58.8-24.9 mole percent 2-bromo-3,3,3-trifluoropropene,
(v) 6.2-20.9 chloroform, and
(vi) 4-18.8 n-hexane;
wherein said component is present in an effective amount to form an azeotropic combination with the Z-1,1,1,4,4,4-hexafluoro-2-butene.

3. A process for producing refrigeration comprising condensing the azeotrope-like composition of claim 1 and thereafter evaporating said azeotrope-like composition in the vicinity of the body to be cooled.

4. A process for producing refrigeration comprising condensing the azeotropic composition of claim 2 and thereafter evaporating said azeotropic composition in the vicinity of the body to be cooled.

\* \* \* \* \*